United States Patent [19]

Cuevas

[11] Patent Number: 5,310,214
[45] Date of Patent: May 10, 1994

[54] AIR BAG SYSTEM FOR RESTRAINING MOVEMENT OF AN ADULT AND/OR A CHILD

[75] Inventor: Jess Cuevas, Scottsdale, Ariz.

[73] Assignee: Talley Automotive Products, Inc., Phoenix, Ariz.

[21] Appl. No.: 862,443

[22] Filed: Apr. 2, 1992

[51] Int. Cl.⁵ .................. B60R 21/24; B60R 21/22
[52] U.S. Cl. ................... 280/729; 280/730 R; 280/743 R; 280/743 A; 280/736
[58] Field of Search .............. 280/728, 730, 732, 736, 280/741, 743, 729, 728 R, 730 R, 743 R, 743 A

[56] References Cited

U.S. PATENT DOCUMENTS

| 3,582,107 | 6/1971 | Goetz . | |
|---|---|---|---|
| 3,642,303 | 2/1972 | Irish et al. | 280/730 |
| 3,688,003 | 8/1972 | Kurtz et al. | 558/337 |
| 3,812,726 | 5/1974 | Bell | 73/503 |
| 4,262,931 | 4/1981 | Strasser et al. | 280/730 X |
| 4,290,627 | 9/1981 | Cumming et al. | 280/732 X |
| 4,698,107 | 10/1987 | Goetz et al. | 280/741 X |
| 4,817,828 | 4/1989 | Goetz | 280/736 X |
| 5,018,762 | 5/1991 | Suzuki et al. | 280/742 X |
| 5,022,675 | 6/1991 | Zelenak, Jr. et al. | 280/743 |
| 5,058,921 | 10/1991 | Cuevas | 280/736 X |
| 5,072,966 | 12/1991 | Nishitake et al. | 280/730 |

FOREIGN PATENT DOCUMENTS

| 0833888 | 4/1990 | Fed. Rep. of Germany | 280/729 |
|---|---|---|---|
| 0132444 | 5/1989 | Japan | 280/729 |
| 4046836 | 2/1992 | Japan | 280/728 |
| 4055141 | 2/1992 | Japan | 280/728 |

Primary Examiner—Brian L. Johnson
Attorney, Agent, or Firm—Tarolli, Sundheim & Covell

[57] ABSTRACT

A vehicle safety apparatus for restraining the movements of an adult and/or a child during a vehicle collision includes an inflatable air bag (18). The air bag has an upper chamber (26) for holding gas to restrain the adult and a lower chamber (28) for holding gas to restrain the child. A first gas source (22) is provided for inflating the upper chamber to a first pressure to restrain the movement of the adult. A second gas source (24) is provided for inflating the lower chamber to a second pressure which is less than the first pressure, to restrain the movement of the child. The first and second gas sources (22, 24) are simultaneously activated to inflate the upper and lower chambers.

23 Claims, 4 Drawing Sheets

AIR BAG SYSTEM FOR RESTRAINING MOVEMENT OF AN ADULT AND/OR A CHILD

BACKGROUND OF THE INVENTION

The present invention relates to a vehicle occupant restraint for restraining movement of a vehicle occupant during a collision, and particularly relates to a vehicle air bag system for restraining movement of an adult and/or a child during a collision.

The design of an air bag system to protect a child is complicated by the fact that the child may be in any one of several positions in a vehicle. Thus, the child may be sitting on the vehicle seat, standing in front of the vehicle seat, sitting on the lap of an adult, or otherwise located in the vehicle. Frequently, the child is at a lower level in the vehicle than the adult. Moreover, the child typically has a weight and stature smaller than the weight and stature of the adult.

SUMMARY OF THE INVENTION

The present invention provides a vehicle air bag system for restraining movement of an adult and/or a child during a collision. The air bag system includes an air bag having upper and lower chambers. The upper chamber restrains movement of an adult. The lower chamber restrains movement of a child.

The air bag is inflated by gas which flows into the air bag from an inflator. The inflator has two gas sources. One of the gas sources supplies gas to inflate the upper chamber of the air bag. The other gas source supplies gas to inflate the lower chamber of the air bag.

The gas source which provides gas to inflate the upper chamber of the air bag provides a greater volume of gas than the gas source which inflates the lower chamber of the air bag. The upper chamber of the air bag is filled with gas at a pressure sufficient to restrain movement of an adult during a collision. The lower chamber of the air bag is filled with gas at a lower pressure than the pressure in the upper chamber. The pressure in the lower chamber of the air bag is sufficient to restrain the movement of a child during a collision. The two gas sources are simultaneously actuated to simultaneously initiate inflation of the upper and lower chambers of the air bag.

BRIEF DESCRIPTION OF THE DRAWINGS

The foregoing and other objects and features of the present invention will become more apparent to one skilled in the art upon reading the following description with reference to the accompanying drawings in which.

DESCRIPTION OF A PREFERRED EMBODIMENT OF THE INVENTION

Figure 1:
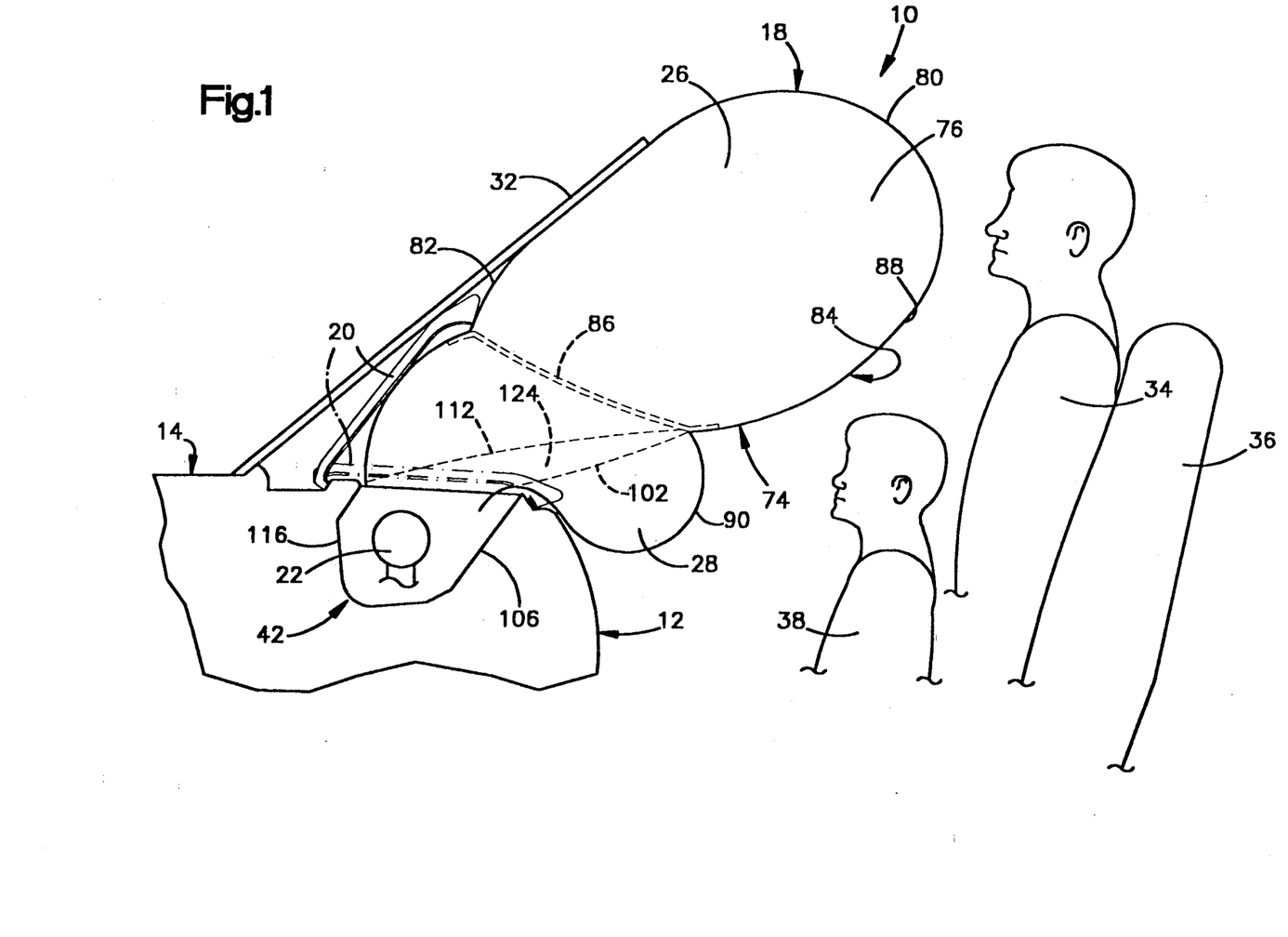
FIG. 1 is a schematic illustration of an air bag system constructed in accordance with the present invention.

An air bag system 10 constructed in accordance with the present invention is illustrated in FIG. 1. The air bag system 10 is located on an instrument panel 12 of a vehicle 14. The air bag system 10 includes an inflatable air bag 18 for enclosing gas separate from an external atmosphere to provide a restraining cushion for vehicle occupants. Prior to inflation, the air bag 18 is stored in a folded condition within the instrument panel 12.

The instrument panel 12 includes a releasable panel 20. The panel 20 covers the stored air bag 18, as shown in dashed lines in FIG. 1, prior to inflation of the air bag. Upon initiation of inflation of the air bag, the panel 20 is pivoted away from the closed position shown in dot-dash lines in FIG. 1 toward the open position shown in solid lines in FIG. 1.

Figure 2:
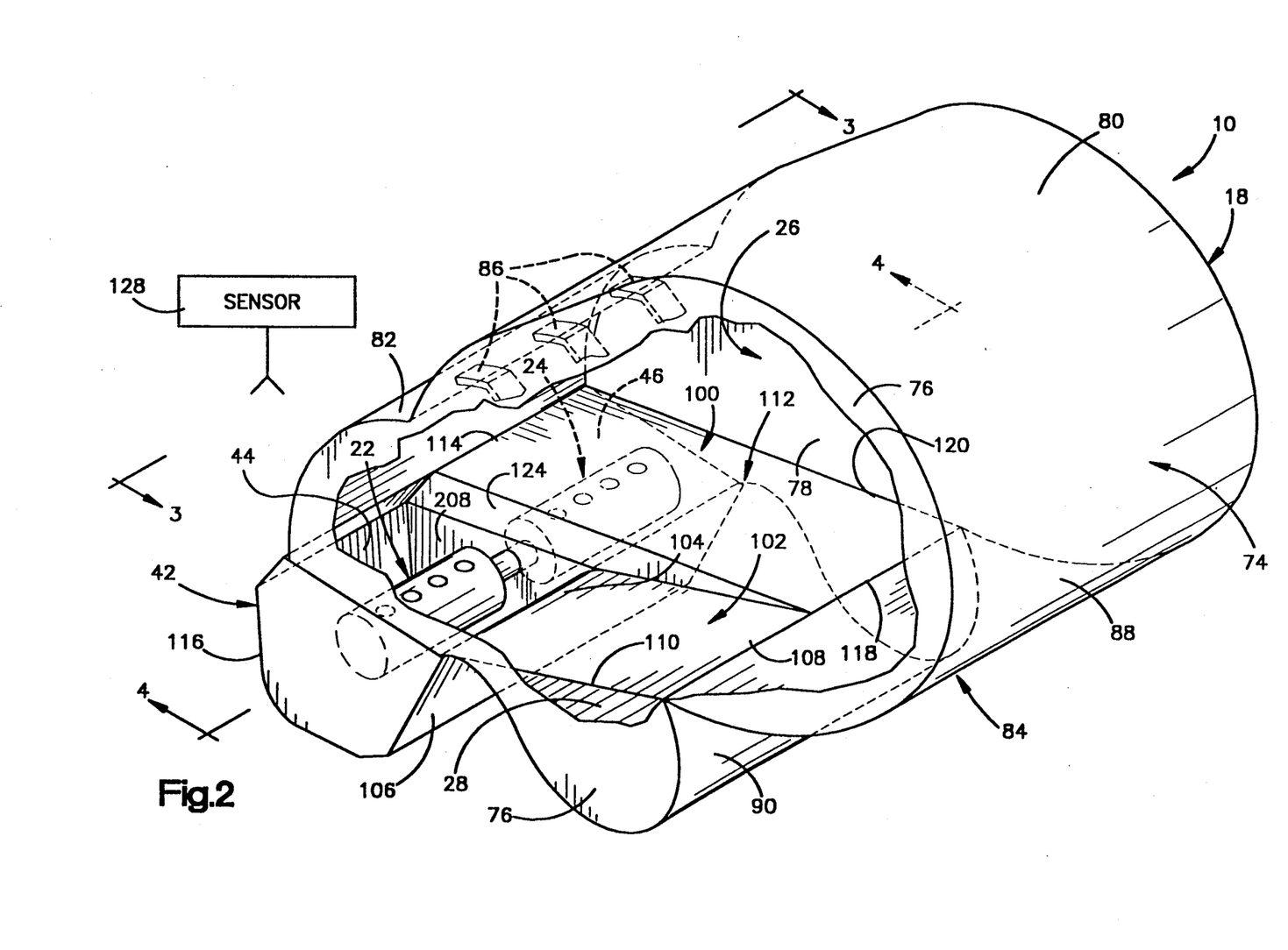
FIG. 2 is a partially broken away pictorial illustration of the air bag system of FIG. 1, illustrating the relationship between upper and lower chambers of an air bag and a pair of gas sources for inflating the air bag.

The air bag system 10 includes a pair of gas sources 22 and 24 (FIG. 2). Upon the occurrence of sudden vehicle deceleration, the gas source 22 supplies gas to inflate an upper or first chamber 26 of the air bag 18. Simultaneously, the gas source 24 supplies gas to inflate a lower or second chamber 28 of the air bag 18. As the upper and lower chambers 26 and 28 of the air bag 18 begin to inflate, the panel 20 is moved by the air bag toward the open position (shown in solid lines in FIG. 1). As gas continues to flow from the gas sources 22 and 24 (FIG. 2), the air bag 18 reaches the fully inflated condition.

The upper chamber 26 of the fully inflated air bag 18 extends upwardly between a windshield 32 (FIG. 1) of the vehicle 14 and an adult 34 on the front seat 36 of the vehicle. The lower chamber 28 of the inflated air bag 18 is disposed below the upper chamber 26 between the instrument panel 12 and a child 38. Thus, the portion of the inflated air bag 18 containing the upper chamber 26 is positioned to restrain movement of the adult 34, while a portion of the air bag containing the lower chamber 28 is positioned to restrain movement of the child 38.

The gas source 22 (FIG. 2) provides a relatively large volume of gas, sufficient to inflate the upper chamber 26 to a relatively high pressure to absorb or mitigate forces applied against the air bag 18 by the adult 34. The forces applied by the adult 34 to the air bag 18 include an inertial force which corresponds to a relative movement of the adult 34 and the weight of the adult 34. The gas source 24 provides a relatively small volume of gas, sufficient to inflate the lower chamber 28 to a relatively low pressure to absorb forces applied against the air bag by the child 38. The forces applied by the child 38 to the air bag 18 include an inertial force which corresponds to a relative movement of the child 38 and the weight of the child 38. The upper chamber 26 is not connected in fluid communication with the lower chamber 28. Since the upper chamber 26 is not in fluid communication with the lower chamber 28, the application of relatively large forces by the adult 34 against the upper portion of the air bag 18 does not force gas from the upper chamber 26 into the lower chamber 28.

The air bag system 10 includes a housing 42 which encloses the gas sources 22 and 24 (FIG. 2). The housing 42 has a first housing compartment 44 in which the gas source 22 is disposed and a second housing compartment 46 in which the gas source 24 is disposed. The housing compartments 44 and 46 are arranged in an elongated linear array with longitudinal axes of the compartments in alignment. The gas sources 22 and 24 are axially aligned with each other. The housing compartments 44 and 46 have open upper end portions.

Upon activation of the gas source 22, gas flows upwardly through the open upper end portion of the housing compartment 44 into the upper chamber 26 of the air bag 18. Similarly, upon activation of the gas source 24, gas flows upwardly through the open upper end portion of the housing compartment 46 into the lower chamber 28 of the air bag 18. The air bag 18 is attached to and encloses the open upper end portions of the housing compartments 44, 46.

The air bag 18 is preferably made of a flexible fabric, the fabric being gas permeable but resistant to the flow of gas through the fabric. The air bag 18 has a continuous outer wall 74 (FIG. 2) which partially defines the upper and lower chambers 26 and 28. The outer wall 74 of the air bag includes a pair of generally parallel end wall panels 76 and 78 (FIG. 2). The outer wall 74 of the air bag also has a main panel 80 which extends between the end panels 76 and 78. The main panel 80 has a forwardly facing portion 82 which engages the windshield 32 (FIG. 1) when the air bag 18 is inflated. The main panel 80 also has a rearwardly facing portion 84 which faces toward and is engageable by the adult 34 and child 38 when the air ba 18 is inflated.

The air bag 18 has tether straps 86 (FIG. 1) which are connected with the main panel 80 to provide the air bag 18 with a desired configuration when the air bag is inflated. Specifically, the tether straps 86 cooperate with the main panel 80 to provide the rearwardly facing portion 84 of the panel with a convex upper portion 88 (FIG. 1) which is engageable by the adult 34 and a convex lower portion 90 which is engageable by the child 38.

The air bag includes a barrier 100 (FIGS. 2 and 3) which blocks gas communication between the upper and lower chambers 26 and 28. The barrier 100 also directs gas from the second gas source 24 into the lower chamber 28. The barrier 100 is preferably made of a flexible fabric which is resistant to a flow of gas through the fabric.

The barrier 100 includes a first panel 102 which extends rearwardly from a rearward edge portion of the housing 42. The panel 102 has a forward edge portion 104 which is connected with an upper edge portion of a rearward side wall 106 of the housing 42. A rearward edge portion 108 of the panel 102 is connected with the main panel 80 at the upper portion of the lower chamber 28. A side edge portion 110 of the first panel 102 is connected with the end panel 76. The first panel 102 is sized to aid in the contouring of the rearwardly facing portion 84 of the main panel 80. When the air bag 18 is inflated, the first panel 102 is flat and extends rearwardly and upwardly from the housing 42 (FIG. 1).

The barrier 100 (FIGS. 2 and 3) also includes a second panel 112 which extends rearwardly from a forward edge portion of the housing 42. The panel 112 has a forward edge portion 114 which is connected with an upper edge portion of a forward side wall 116 (FIG. 3) of the housing 42. A rearward edge portion 118 of the panel 112 is connected with the main panel 80 at the upper portion of the lower chamber 28. A side edge portion 120 of the second panel 112 is connected with the end panel 78. The second panel 112 is sized to aid in contouring of the rearwardly facing portion 84 of the main panel 80 when the air bag 18 is inflated. When the air bag 18 is inflated, the second panel 112 is flat and extends rearwardly and upwardly from the housing 42 (FIG. 1) at an acute angle to the first panel 102.

Figure 3:
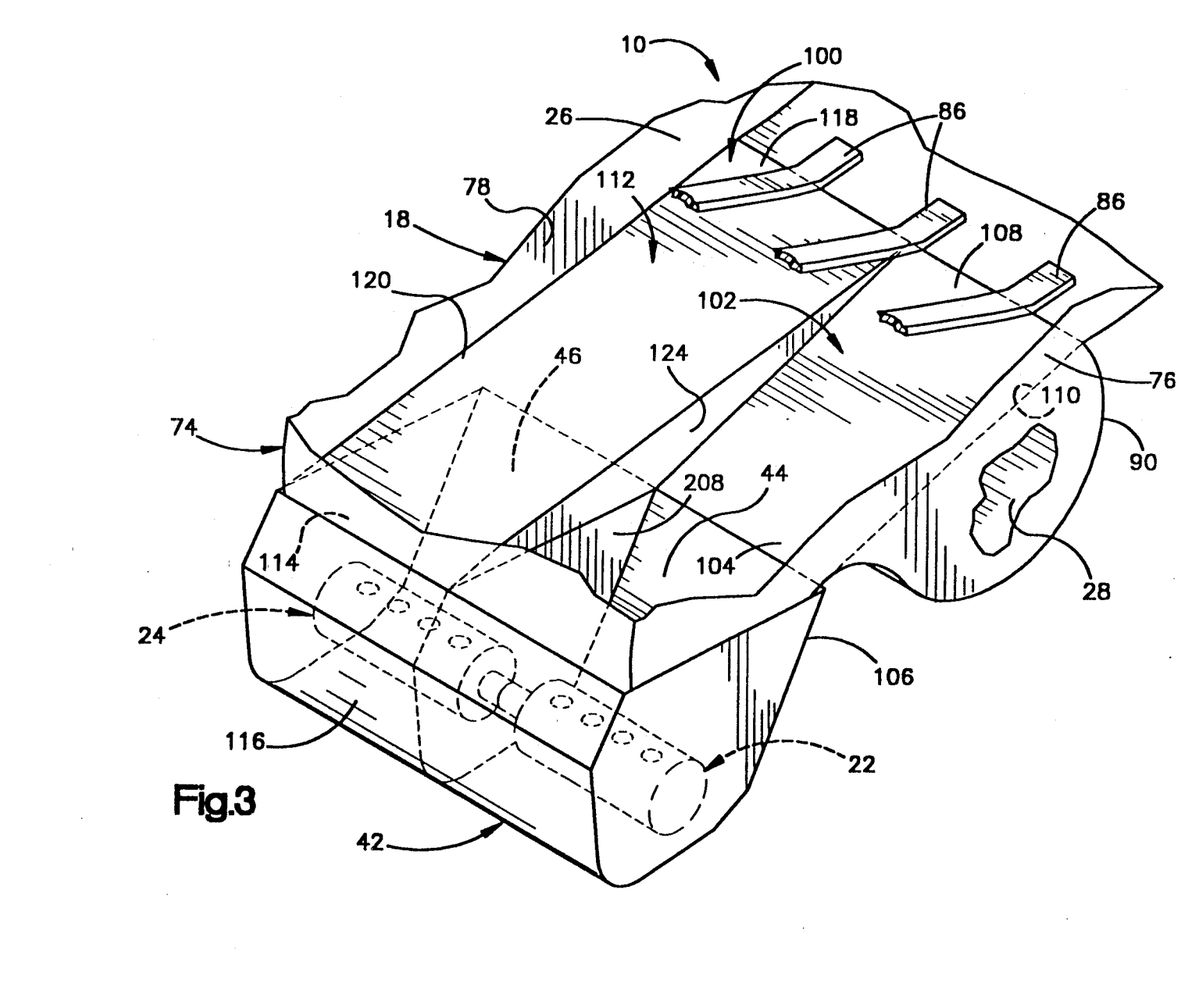
FIG. 3 is a partially broken away pictorial view, taken generally along line 3—3 of FIG. 2, illustrating a barrier which blocks gas flow between the upper and lower chambers of the air bag of FIGS. 1 and 2.

The panel 112, which extends across the upper end portion of the second housing compartment 46, directs a flow of gas from the gas source 24 into the lower chamber 28 of the air bag 18. The panel 102, which does not extend across the second housing compartment 46, is effective to block the gas from the gas source 22 from entering the lower chamber 28.

In addition to the panels 102 and 112 the barrier 100 includes a generally triangular shaped side panel 124 which extends between and is connected with the panels 102 and 112. The side panel 124 blocks a sideward flow of gas from the lower chamber 28 into the upper chamber 26.

Upon sudden deceleration of the vehicle 14, a sensor 128 simultaneously activates the gas sources 22 and 24. Any suitable sensor may be used. Sensors suitable for use in activating the gas sources 22 and 24 are described in U.S. Pat. No. 3,688,003 to Bell, entitled "Crash Sensing Switch", and U.S. Pat. No. 3,812,726 to Bell, entitled "Velocity Responsive Apparatus".

The two gas sources 22 and 24 (FIG. 4) are similar to those described in U.S. Pat. No. 5,058,921 to Cuevas and entitled "Linear Bi-Lateral Inflator Device". An ignition squib 140 (FIG. 4) is connected to sensor 128 via leads 142. The ignition squib 140 is located in a firing chamber 144 and is positioned to ignite simultaneously a combustible gas generating material 146 in gas source 22 and a combustible gas generating material 148 in gas source 24. The combustion of the gas generating materials 146 and 148 provides gas to the inflatable air bag 18 to inflate the upper chamber 26 and the lower chamber 28 simultaneously. The gas generating materials 146 and 148 contain an alkali metal azide and other materials and may be as disclosed in U.S. Pat. No. 4,698,107, to Goetz et al., entitled "Gas Generating Material".

The gas generating material 146 of gas source 22 is encased within an elongated cylindrical inner housing 150 (FIG. 4) which extends axially away from the squib 140. A plurality of circular gas ports 152 are disposed in the bottom surface of the inner housing 150 to allow gas provided by the gas generating material 146 to pass through the inner housing 150.

Figure 4:
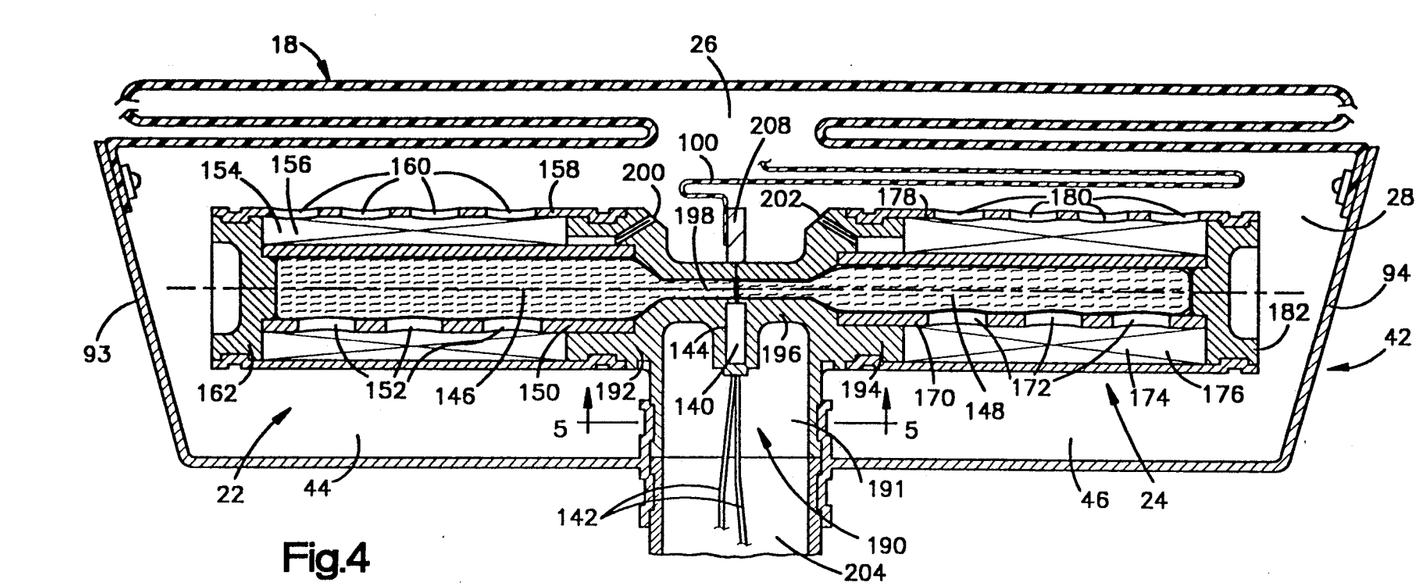
FIG. 4 is a sectional view, taken along the line 4—4 of FIG. 2, with the air bag in a deflated condition and illustrating the construction of the gas sources used to inflate the air bag.

Surrounding the inner housing 150 is a cylindrical chamber 154 which allows gas provided by the gas generating material 146 to circulate around the inner housing 50. Within the cylindrical chamber 154 is a cylindrical body of filter material 156 for filtering the gas generated by the gas generating material 146. The filter material 156 includes wire mesh screen and layers of steel wool and ceramic/glass wool. The filter material 156 may be constructed and may function in the same manner as is disclosed in U.S. Pat. No. 4,817,828 issued Apr. 4, 1989 to George W. Goetz and entitled "Inflatable Restraint System⇌.

Surrounding the filter material 156 is an elongate cylindrical outer housing 158 confining the filter material 156. A plurality of circular gas ports 160 are disposed in the upper surface of the outer housing 158 to allow gas generated by the gas generating material 146 to pass through the outer housing 158. The inner housing 150 and outer housing 158 are connected at one end to a circular end plug 162. The circular end plug 162 closes the ends of the housings 150 and 158 and maintains a radially spaced relationship between the inner housing 150 and the outer housing 158.

Upon combustion of the gas generating material 146, the generated gas must pass downwardly through the plurality of circular gas ports 152 in the inner housing 150 and radially and circumferentially through the cylindrical chamber 154 and the filter material 156. The gas must then pass upwardly through the plurality of circular gas ports 160 disposed in the outer housing 158 and into the upper chamber 26 of the air bag 18.

The gas source 24 (FIG. 4) is constructed in the same manner as gas source 22 and operates in the same manner upon the combustion of the gas generating material 148. The gas source 24 includes an elongated cylindrical inner housing 170 with a plurality of circular gas ports 172 disposed in the bottom surface of the inner housing 170. A cylindrical chamber 174 surrounds the inner housing 170 and filter material 176 is disposed within the cylindrical chamber 174. The gas source 24 also includes an elongate cylindrical outer housing 178 with a plurality of circular gas ports 180 disposed in the outer housing 178. A circular end plug 182 closes one end of each housing 170 and 178.

Upon combustion of the gas generating material 148, the gas source 24 provides gas to inflate the lower chamber 28 of the air bag 18 in a manner similar to the way the gas source 22 provides gas to inflate the upper chamber 26. As illustrated in FIG. 4, the amount of gas generating material 148 is less than the amount of gas generating material 146. Thus, gas source 24 provides a volume of gas to the lower chamber 28 which is less than the amount of gas provided by gas source 22 to the upper chamber 26.

A hollow one-piece connector 190 interconnects the gas sources 22, 24 (FIG. 4). The connector 190 has two opposed and spaced apart circular end portions 192 and 194. The end portion 192 is attached to the gas source 22 and supports the inner housing 150 and outer housing 158 in a radially spaced relationship. Similarly, the end portion 194 is attached to the gas source 24 and supports the inner housing 170 and outer housing 178 in a radially spaced relationship.

Figure 5:
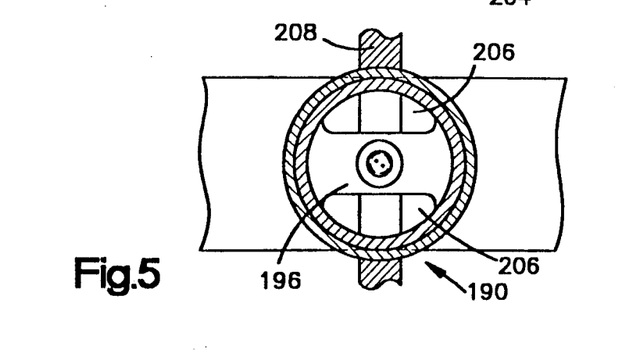
FIG. 5 is a sectional view taken along line 5—5 of FIG. 4 illustrating a vent passage through which air is aspirated during inflation of the air bag.

Extending between the end portions 192 and 194 of the connector 190 is a central portion 196 (FIGS. 4 and 5). The central portion 196 of the connector 190 includes the firing chamber 144 which houses the ignition squib 140 at a position equally spaced between the gas generating materials 146 and 148. An ignition passage 198 extends through the end portions 192 and 194 and the central portion 196 of the connector 190. Portions of the gas generating materials 146 and 148 fill the ignition passage 198 and extend to a location proximate the ignition squib 140. The location of portions of the gas generating materials 146 and 148 proximate the ignition squib 140 allows for simultaneous ignition of the gas generating materials 146 and 148.

Formed in the end portions 192 and 194 are angled ga ports 200 and 202. The angled gas ports 200 and 202 connect the cylindrical chambers 154 and 174 of the gas sources 22 and 24 to an area within the air bag 18 above the connector 190. The connector 190 is connected to a vent tube 204 which leads to the outside atmosphere and provides a conduit for non-combustion gas, namely, air, for aspiration into the air bag 18. Disposed on either side of the central portion 196 of the connector 190 are openings 206 (FIG. 5). Each of the openings 206 extends across a rigid housing barrier wall 208 and connects a passage 191 of the one-piece connector 190 to both the upper and lower chambers 26 and 28 of the air bag 18. Upon combustion of the gas generating materials 146 and 148, a portion of the gas produced will travel through the angled gas ports 200 and 202 and will cause aspiration of non-combustion gas through the passage 191 in the connector 190. The barrier wall 208 of the housing 42 is connected with the side panel 124 (FIG. 2) of the barrier 100 and cooperates with the side panel to block a flow of gas between the upper and lower chambers 26 and 28 of the air bag 18.

Upon the occurrence of a vehicle collision, the sensor 128 (FIG. 2) completes an electrical circuit to provide an electrical signal to ignition squib 140 (FIG. 4). The electrical signal causes the ignition squib 140 to ignite. Ignition of the squib 140 within the firing chamber 144 simultaneously ignites the gas generating materials 146 and 148 of gas sources 22 and 24. The portions of the gas generating materials 146 and 148 located within the ignition passage 198 ignite first. Each ga generating material 146 and 148 simultaneously deflagrates outwardly from the connector 190 producing substantial volumes of gas in a short time.

The gas produced by the deflagration of gas generating material 146 (FIG. 4) passes downwardly through the plurality of circular gas ports 152, and then passes radially and circumferentially through the filter material 156. The gas then passes through the plurality of circular gas ports 160 in the elongate cylindrical outer housing 158 and into the upper chamber 26 of the air bag 18. A portion of the gas also passes through the angled gas port 200. This causes aspiration of non-combustion gas through the one-piece connector 190 to aid in the inflation of the upper chamber 26 of the air bag 18.

Simultaneously and in the same manner, the second gas source 24 will supply gas to the lower chamber 28. As both the upper and lower chambers 26 and 28 begin to inflate, the releasable panel 20 (FIG. 1) of the instrument panel 12 is moved to an open position allowing full deployment of the air bag 18.

The gas from the gas source 22 is directed upwardly into the upper chamber 26 by the panel 102 of the barrier 100 (FIG. 2) and is blocked from entering the lower chamber 28 by the panels 102, 112 and 124 of the barrier. The gas from the gas source 24 is directed into the lower chamber 28 by the panel 112 of the barrier 100. A portion of the gas within the lower chamber 28 will travel along the length of the lower chamber beneath the first panel 102 of the barrier 100. The gas within the lower chamber 28 is confined by the outer wall 74 and blocked from entering the upper chamber 26 by the barrier 100.

As the upper chamber 26 fills with gas from the gas source 22, the forwardly facing portion 82 (FIG. 2) of the air bag 18 extends upwardly along the windshield 32 (FIG. 1) of the vehicle 14. Simultaneously, the upper portion as of the rearwardly facing portion 84 extends toward the adult 34.

As the lower chamber 28 fills with gas, the lower portion 90 of the air bag 18 extends downwardly in front of the instrument panel 12 of the vehicle 14 and outwardly toward the child 38. Because the volume of gas necessary to fill the lower chamber 28 is significantly smaller than the volume of gas necessary to fill the upper chamber 26, the lower chamber attains a fully inflated status prior to the upper chamber. The fully inflated status of the lower chamber 28 prior to that of the upper chamber 26 is desirable because the child 38 is often located at a position forward of the adult 34

The volume of gas produced by the second gas source 24 is significantly less than the volume of gas produced by the first gas source 22. This results in a lower pressure in the lower chamber 28 than in the upper chamber 26. This provides a softer surface of impact for the child 38 on the portion 90 of the air bag 18. This also provides a firmer surface of impact for the adult 34 on the upper portion 88 of the air bag 18. In other words, the lower pressure in the lower chamber 28 permits a greater yielding of the lower chamber 28 per unit of inertial force applied to the lower portion 90 of the air bag 18 than a yielding of the upper chamber 26 per unit of inertial force applied to the upper portion 88 of the air bag 18, when the units of force are equal, for limiting impact stress on the child 38. The final shape of the fully deployed air bag 18 is aided by the tether straps 86 and barrier 100 which restrain the rearwardly facing portion 84 at a desired distance from the front of the adult 34 and the child 38.

When the adult 34 strikes the upper portion 88 of the air bag 18, the barrier 100 blocks a flow of gas from the upper chamber 26 to the lower chamber 28. The fully inflated air bag 18 can restrain movement of the adult 34 without the presence of the child 38. The fully inflated air bag 18 can also restrain movement of the child 38 without the presence of the adult 34. The fully inflated air bag 18 restrains movements of both the adult and child 34 and 38 when both are present.

From the above description of the invention, those skilled in the art will perceive improvements, changes and modifications. Such improvements, changes and modifications within the skill of the art are intended to be covered by the appended claims.

Having described the invention, the following is claimed:

1. A vehicle safety apparatus for restraining movement of an adult and/or a child, said apparatus comprising:
   an inflatable air bag having wall means for at least partially defining an upper chamber for holding gas to restrain the adult and a lower chamber for holding gas to restrain the child;
   a first gas source for inflating said upper chamber to a first pressure to restrain the adult;
   a second gas source for inflating said lower chamber to a second pressure which is less than said first pressure to restrain the child;
   means for simultaneously actuating said first and second gas sources to inflate said upper and lower chambers; and
   barrier means for separating said upper chamber from said lower chamber, said barrier means at least partially defining said upper and lower chambers.

2. An apparatus as set forth in claim 1 wherein said barrier means is formed of fabric and is flexible.

3. An apparatus as set forth in claim 1 wherein said barrier means retards gas flow between said upper and lower chambers.

4. A vehicle safety apparatus for restraining movement of an adult and/or a child, said apparatus comprising:
   an inflatable air bag having wall means for at least partially defining an upper chamber for holding gas to restrain the adult and a lower chamber for holding gas to restrain the child;
   a first gas source for inflating said upper chamber to a first pressure to restrain the adult;
   a second gas source for inflating said lower chamber to a second pressure which is less than said first pressure to restrain the child;
   means for simultaneously actuating said first and second gas source to inflate said upper and lower chambers;
   a first longitudinally extending compartment for holding said first gas source; and
   a second longitudinally extending compartment for holding said second gas source, said first and second compartments being disposed in a linear array with the longitudinal axes of said first and second compartments being in alignment;
   said wall means having a forwardly facing portion, a rearwardly facing portion and two side portions, said rearwardly facing portion of said wall means having an outer side surface area facing toward the adult and/or child and being disposed on a first side of the linear array of compartments, said rearwardly facing portion of said wall means being contoured to have a lower surface area for engagement with the child and an upper surface area for engagement with the adult, said lower surface area being convex and extending outwardly and downwardly from the linear array of compartments, said upper surface area being convex and extending outwardly and upwardly from said lower surface area, said upper and lower surface areas each having a length which is at least as great as the length of the linear array of compartments.

5. A vehicle safety apparatus for restraining movement of an adult and/or a child and for absorbing inertial energy, said apparatus comprising:
   an inflatable air bag having wall means for defining an upper chamber for holding gas to restrain said adult and a lower chamber for holding gas to restrain said child;
   a first gas source means for inflating said upper chamber to a relatively high pressure for positioning a portion of said wall means to provide a relatively firm surface of impact for said adult and for restraining said adult;
   a second gas source means for inflating said lower chamber to a relatively low pressure for positioning a portion of said wall means to provide a relatively soft surface of impact for said child and for restraining said child; and
   means for simultaneously actuating said first and second gas source means for inflating upper and lower chambers simultaneously.

6. An apparatus as set forth in claim 5 wherein said wall means including an outer wall for separating said upper and lower chambers from an external atmosphere.

7. An apparatus as set forth in claim 5 wherein said upper and lower chambers are effectively sealed from each other for preventing gas from the upper chamber from entering the lower chamber due to inertial force of said adult.

8. An apparatus as set forth in claim 5 further including tether straps attached to said inflatable air bag and extending across said upper chamber.

9. An apparatus as set forth in claim 5 wherein said first gas source means is a first gas generator and said second gas source means is a second gas generator.

10. An apparatus as set forth in claim 9 wherein said first and second gas generators each contain gas generating material, the amount of said gas generating material contained in said first gas generator being greater than the amount of said gas generating material contained in said second gas generator.

11. An apparatus as set forth in claim 5 further including barrier means for preventing gas flow from said first gas source means from entering into said lower chamber and for preventing gas flow from said second gas source means from entering into said upper chamber.

12. An apparatus as set forth in claim 5 further including a first longitudinally extending compartment for holding said first gas source means and a second longitudinally extending compartment for holding said second gas source means, said first and second compartments being disposed in a linear array with the longitudinal axes of said first and second compartments being in alignment.

13. An apparatus as set forth in claim 12 further including barrier means for blocking gas flow between said upper and lower chambers, said barrier means at least partially defining said upper and lower chambers.

14. An apparatus as set forth in claim 5 wherein said first gas source means is effective to provide a first volume of gas, said second gas source means is effective to provide a second volume of gas, said first volume of gas being greater than said second volume of gas, said first and second gas source means including means for fully inflating said lower chamber prior to full inflation of said upper chamber.

15. A vehicle safety apparatus for restraining movement of an adult and/or child, said apparatus comprising:
an inflatable air bag having a first upper chamber for holding gas to restrain said adult and a second lower chamber for holding gas to restrain said child, said air bag having an outer wall for separating said first and second chambers from an external atmosphere and for partially defining said first chamber and partially defining said second chamber;
a first gas source means for producing a relatively low volume of gas for inflating said second chamber to a relatively low pressure.

16. An apparatus as set forth in claim 15 wherein a portion of said outer wall which at least partially defines said first chamber is positioned to restrain movement of said adult, and a portion of said outer wall which at least partially defines said second chamber is positioned to restrain movement of said child.

17. An apparatus as set forth in claim 15 further including barrier means for separating said first chamber from said second chamber, said barrier means at least partially defining said upper and lower chambers.

18. An apparatus as set forth in claim 15 further including means for simultaneously actuating said first and second gas source means.

19. An apparatus as set forth in claim 15 wherein said first gas source means is a gas generator and said second source means is a second gas generator.

20. A vehicle safety apparatus for restraining movement of an adult and/or a child, said apparatus comprising:
a single inflatable air bag having wall means for at least partially defining an upper chamber for holding gas to restrain said adult and a lower chamber for holding gas to restrain said child;
a first gas source means for inflating said upper chamber to a first pressure to restrain said adult;
a second gas source means for inflating said lower chamber to a second pressure which is less than said first pressure to restrain said child; and
means for simultaneously actuating said first and second gas source means to inflate said upper and lower chambers.

21. An apparatus as set forth in claim 20 wherein said wall means includes a continuous outer wall which at least partially defines said upper chamber and which at least partially defines said lower chamber.

22. A method for restraining movement of an adult and/or a child in a vehicle, said method comprising:
providing an inflatable air bag having a wall defining an upper chamber for holding gas to restrain the adult and a lower chamber for holding gas to restrain the child;
providing a first gas source for inflating the upper chamber;
providing a second gas source for inflating the lower chamber;
actuating the first and second gas sources;
deploying the air bag, including inflating the upper and lower chambers of the air bag to locate the upper chamber for engagement with the adult and to locate the lower chamber lower than the upper chamber for engagement with the child, and including inflating the upper chamber to a relatively high pressure for restraining the adult, and inflating the lower chamber to a relatively low pressure for restraining the child;
engaging the adult against the wall at the upper chamber of the air bag; and
engaging the child against the wall at the lower chamber of the air bag.

23. A method of restraining movement of an adult and/or a child in a vehicle with an air bag which has a wall defining an upper chamber and a lower chamber, said method comprising:
inflating the upper chamber to a relatively high pressure to position the upper chamber to engage the adult and to restrain the adult;
inflating the lower chamber to a relatively low pressure to position the lower chamber below the upper chamber to engage the child and to restrain the child;
engaging the adult against the wall at the upper chamber of the air bag; and
engaging the child against the wall at the lower chamber of the air bag.

\* \* \* \* \*

UNITED STATES PATENT AND TRADEMARK OFFICE
CERTIFICATE OF CORRECTION

PATENT NO. : 5,310,214

DATED : May 10, 1994

INVENTOR(S) : Jess Cuevas

It is certified that error appears in the above-identified patent and that said Letters Patent is hereby corrected as shown below:

Column 8, line 7, change "source" to --sources--.

Column 9, line 46, after "relatively" insert --large volume of gas for inflating said first chamber to a relatively high pressure; and a second gas source means for producing a relatively--.

Signed and Sealed this

Fourth Day of October, 1994

Attest:

BRUCE LEHMAN

Attesting Officer

Commissioner of Patents and Trademarks